Feb. 21, 1933.  M. SCUDDER  1,898,600
FOOTBALL, BASKET BALL, AND THE LIKE
Filed Feb. 5, 1930
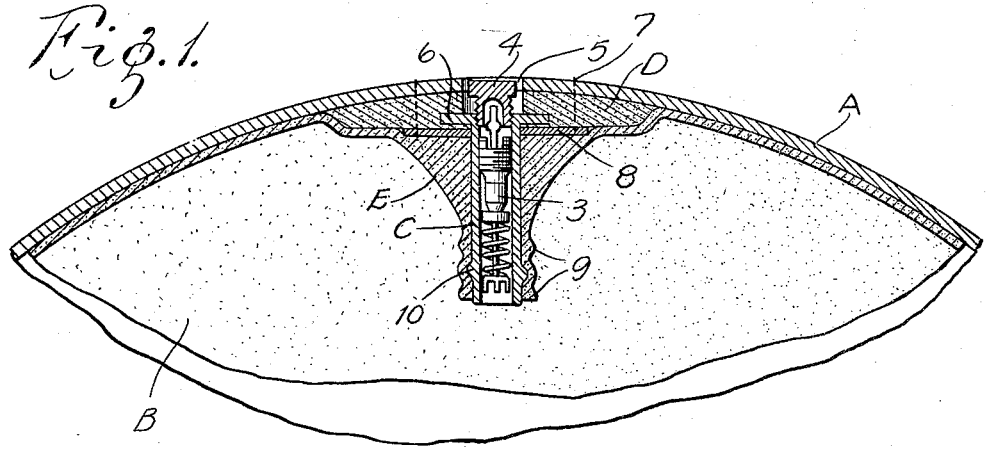
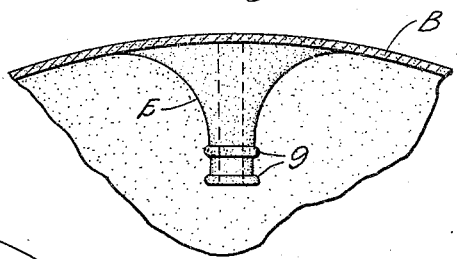
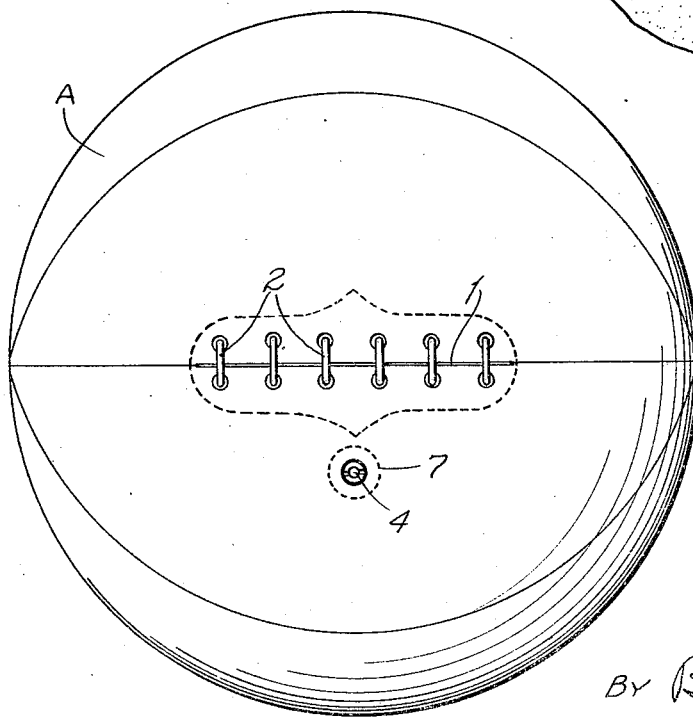
INVENTOR.
MASON SCUDDER.
By Bakewell & Church
ATTORNEYS Patented Feb. 21, 1933

1,898,600

UNITED STATES PATENT OFFICE

MASON SCUDDER, OF CLAYTON, MISSOURI, ASSIGNOR TO RAWLINGS MANUFACTURING COMPANY, OF ST. LOUIS, MISSOURI, A CORPORATION OF MISSOURI

FOOTBALL, BASKET BALL, AND THE LIKE

Application filed February 5, 1930. Serial No. 426,080.

This invention relates to footballs, basket balls and similar balls of the kind that consist of an outer casing that surrounds an inflated bladder, and particularly balls of the type in which the bladder can be inflated without disturbing the lacing of the slit in the casing through which the bladder is inserted.

In various makes of balls of the general type mentioned that are now on the market the inflating valve is permanently connected to or combined with the bladder so as to form a complete unit which can be inserted in or withdrawn from the casing, and the casing is equipped with a nut or other internally screw-threaded part that is adapted to co-operate with external screw threads on the metallic stem of the inflating valve so as to join the bladder to the casing and hold said parts in such relationship that the bladder will not shift bodily relatively to the casing, and the inflating valve on the bladder will not move into such a position that it cannot be coupled with an inflating pump in the event the bladder becomes deflated.

The object of my invention is to provide a football, basket ball or the like that can be inflated without disturbing the lacing of the casing, but which is of such design that no screw-threaded parts are required to connect the bladder with the casing and maintain the bladder and casing in such relationship that the inflating valve is always accessible. To this end I have devised a ball which is distinguished from the balls of this general type that are now in commercial use, in that the inflating valve is permanently mounted on or combined with the casing, and the bladder is so constructed that it can be easily stripped off of the metallic stem of the inflating valve in the event it becomes necessary to repair or replace the bladder.

Figure 1 of the drawing is a fragmentary sectional view of a ball constructed in accordance with my present invention.

Figure 2 is a side elevational view of the tubular portion on the bladder that is adapted to receive the metallic stem of the inflating valve; and Figure 3 is a top plan view of the ball, showing the lacing that closes the slit in the casing through which the bladder is inserted, and the hole in the casing that provides access to the inflating valve.

In the accompanying drawing, which represents the preferred form of my invention, A designates the outer casing of a football, basket ball or similar ball, and B designates a bladder that is arranged inside of said casing, the casing A usually being constructed of leather and the bladder B being constructed of rubber. The casing A is provided with a slit or opening 1, which is of such dimensions that the bladder B can be easily introduced into or withdrawn from the casing when said bladder is deflated. Normally, the slit 1 is closed by a lacing or other suitable device 2, shown in Figure 3, which prevents the opposed edges of said slit from separating when the bladder is inflated. The ball is provided with an inflating valve, which is of such construction that the nipple or nozzle on the hose of an inflating pump can be easily connected with same when it is desired to pump air into the bladder B to inflate the same. Said inflating valve is of a type that is now in common use and consists of a tubular metallic member C, commonly referred to as the "stem", inside of which is arranged a spring-seated valve 3 that will open automatically when subjected to the pressure of an inflowing stream of air that is being forced through the stem C by an inflating pump, and which will seat automatically when said pressure ceases. The valve stem C is provided at its outer end with internal screw threads that are adapted to receive the nozzle or coupling device on the hose of the inflating pump, and after the pump has been disconnected from the inflating valve, a cap 4 is screwed into the outer end of the stem C so as to protect the valve 3 from dirt or other foreign matter. The casing A is provided with a hole 5 through which the coupling device of the inflating pump is adapted to be inserted in the operation of connecting the pump with the inflating valve. The said hole 5 may be arranged at one side of the slit 1 in the casing, as shown in Figure 3, or it may be arranged at any other suitable point or preferred point in the casing.

In my improved ball the valve stem C, which is arranged on the inside of the casing A, as shown in Figure 1, is permanently connected to or combined with said casing, so that it forms in effect a fixture or integral portion of the casing. Various means may be employed to attach or secure the valve stem to the casing, but I prefer to provide the valve stem C at its outer end with a flange or enlarged portion 6 that is imbedded in a disk-shaped attaching member D by a vulcanizing operation, the member D being constructed of rubber or rubber and fabric and being molded onto the flange or other part 6 at the outer end of the valve stem C. The attaching member D is arranged on the inner side of the casing A at such a point that the hole 4 in said casing aligns with the stem C of the inflating valve, and said attaching member D is then permanently connected to the casing, preferably by thread stitches 7, that pass through the casing and through the attaching member D, as shown in Figure 1. If desired, a reinforcing member 8, formed of leather or other suitable material, can be arranged on the inner side or underside of the member D, and held in position by the stitches 7 that secure the member D to the casing.

The bladder B is provided with an inwardly-projecting tubular portion E, which is of such design or construction that it will normally surround the valve stem C and grip the same tightly enough to produce an air-tight joint between the bladder B and valve stem C, but will be capable of being stripped off the valve stem in the event it becomes necessary to repair or replace the bladder. Usually, the inwardly-projecting portion E of the bladder will be provided with one or more constriction bands 9 that reinforce and strengthen the tubular portion E and tend to cause said tubular portion to snugly surround the valve stem C. If desired, the valve stem C may be provided with an annular rib 10 arranged so that when the bladder B is in its normal position, said rib 10 will be positioned between two constriction bands 9 on the tubular portion E of the bladder, thereby effectively maintaining the bladder in position and preventing it from dropping off the valve stem C in the event the bladder becomes deflated. Obviously, the air that is forced into the bladder to inflate the same is exerted on the tubular portion E of the bladder in a direction to hold said portion in sufficiently snug engagement with the valve stem C to produce an air-tight joint between said parts. In order to reduce the tendency of the tubular portion E to tear away from the bladder at the point where it is attached to the bladder, the tubular portion E is flared, thickened, or enlarged at the point where it merges into the bladder so as to form in effect a gusset between the bladder and the inwardly-projecting tubular portion E on the bladder.

A ball of the construction above described is inexpensive to manufacture; it has no "hard spot" on same, due to the fact that the valve stem C is permanently connected to the casing by a resilient attaching member D that encases the flange 6 at the upper end of the valve stem which constitutes the connection between the stem and the attaching member D; and notwithstanding the fact that the inflating valve is permanently combined with or connected to the casing of the ball, the bladder of the ball can be easily repaired or replaced simply by removing the lacing 2, so as to afford access to the bladder and then stripping the bladder off the stem C of the inflating valve. A new bladder or repaired bladder can be easily combined with the casing by forcing the tubular portion E of the bladder upwardly over the stem C of the inflating valve, and after the bladder has been inflated, the internal pressure of the bladder will maintain a tight joint between the bladder and the valve stem.

Having thus described my invention, what I claim as new and desired to secure by Letters Patent is:

1. A ball of the kind described, comprising a bladder, a casing for said bladder provided with an opening through which the bladder can be introduced into the casing, the casing having a hole separate and distinct from said opening, an inflating valve provided with a stem that is arranged on the interior of the casing in alignment with said hole, an attaching member vulcanized onto a part on said stem, means for permanently connecting said attaching member to the casing, and an inwardly-projecting tubular portion on the bladder surrounding said stem and provided with a constriction band that tends to cause said tubular portion to tightly surround said stem.

2. A ball of the kind described, comprising a bladder, a casing for said bladder provided with an opening through which the bladder can be introduced into the casing, an inflating valve arranged on the interior of the casing and provided with a tubular metallic stem whose upper end is internally threaded, the casing having a hole arranged in alignment with said stem, a laterally-projecting flange on said stem, an attaching member vulcanized onto said flange, a reinforcing member positioned under said attaching member, stitches that pass through said reinforcing member, attaching member and casing so as to permanently connect the valve stem to the casing, an inwardly-projecting tubular portion on the bladder reinforced at the point where it is joined to the bladder, said tubular portion receiving the valve stem and being adapted to be stripped off of said stem in the event removal of the bladder from the casing becomes necessary, a rib on the exterior of said valve stem, and constriction bands on the tubular portion of the bladder arranged at points above and below the rib on the valve stem.

MASON SCUDDER.